United States Patent [19]
Dunder et al.

[11] 3,751,059
[45] Aug. 7, 1973

[54] CANTILEVER-TYPE, NESTABLE SHOPPING CARTS

[75] Inventors: David N. Dunder, Glendora; Howard Lee James, Sylmar, both of Calif.

[73] Assignee: Technibitt Corporation, Burbank, Calif.

[22] Filed: Sept. 21, 1971

[21] Appl. No.: 182,390

[52] U.S. Cl..... 280/33.99 F, 186/1 AC, 280/DIG. 4
[51] Int. Cl............................................. B62b 3/04
[58] Field of Search................... 280/33.99, 47.35, 280/36 B, DIG. 4; 186/1 AC, 1 R

[56] References Cited
UNITED STATES PATENTS

| | | |
|---|---|---|
| 3,052,319 | 9/1962 | Swanson............... 280/33.99 F X |
| 3,245,498 | 4/1966 | Stanley et al............. 280/33.99 F X |
| 3,375,018 | 3/1968 | Close ......................... 280/33.99 R |
| 3,437,176 | 3/1969 | Ruttenberg et al....... 280/33.99 F X |
| 3,503,622 | 3/1970 | Romero...................... 280/33.99 F |
| 3,645,554 | 2/1972 | Von Stein et al............ 280/33.99 R |

Primary Examiner—Benjamin Hersh
Assistant Examiner—David M. Mitchell
Attorney—Morsell & Morsell

[57] ABSTRACT

A cantilevered shopping cart wherein the forward end of the basket is wider than the rearward end, said forward end being provided with a bottom-hinged gate swingable either forwardly from its closed, upright position to an open position to allow the easy removal of the basket contents, or rearwardly and downwardly to a horizontal position to allow the telescopic nesting of a plurality of carts, said cart being provided with a novel collapsible baby seat located at its smaller end.

9 Claims, 11 Drawing Figures

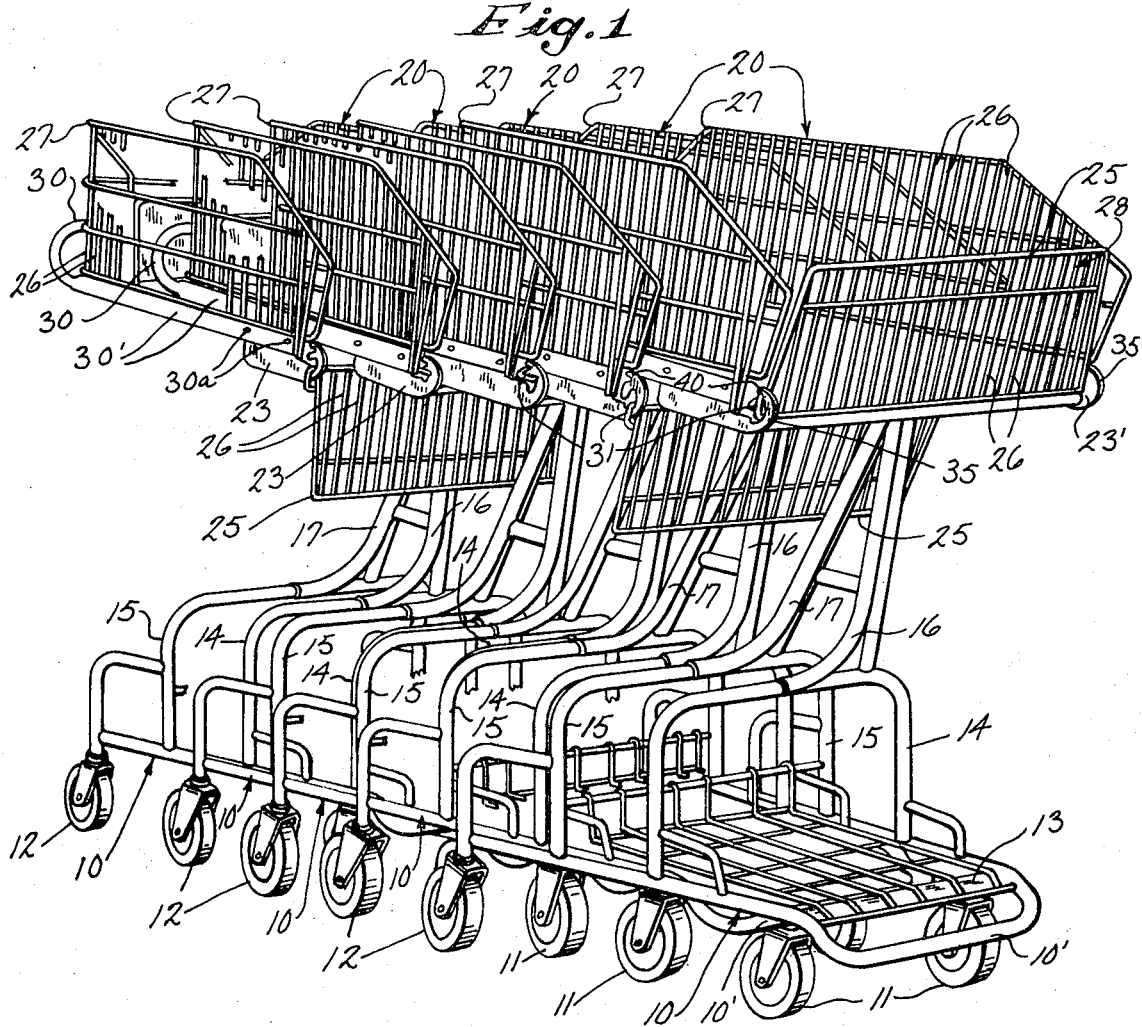

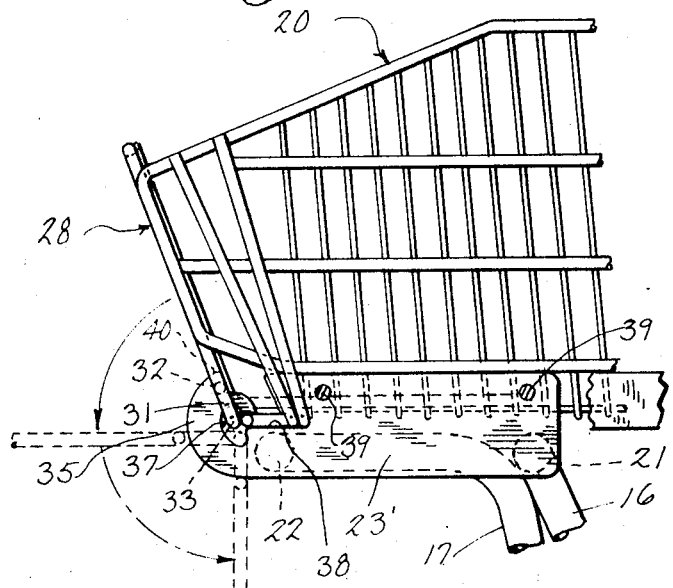
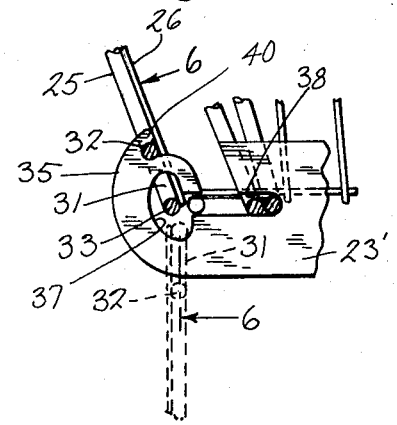
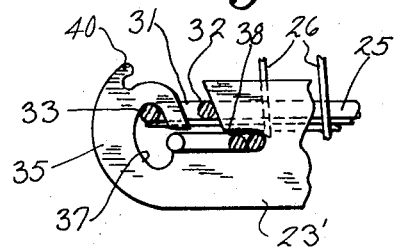
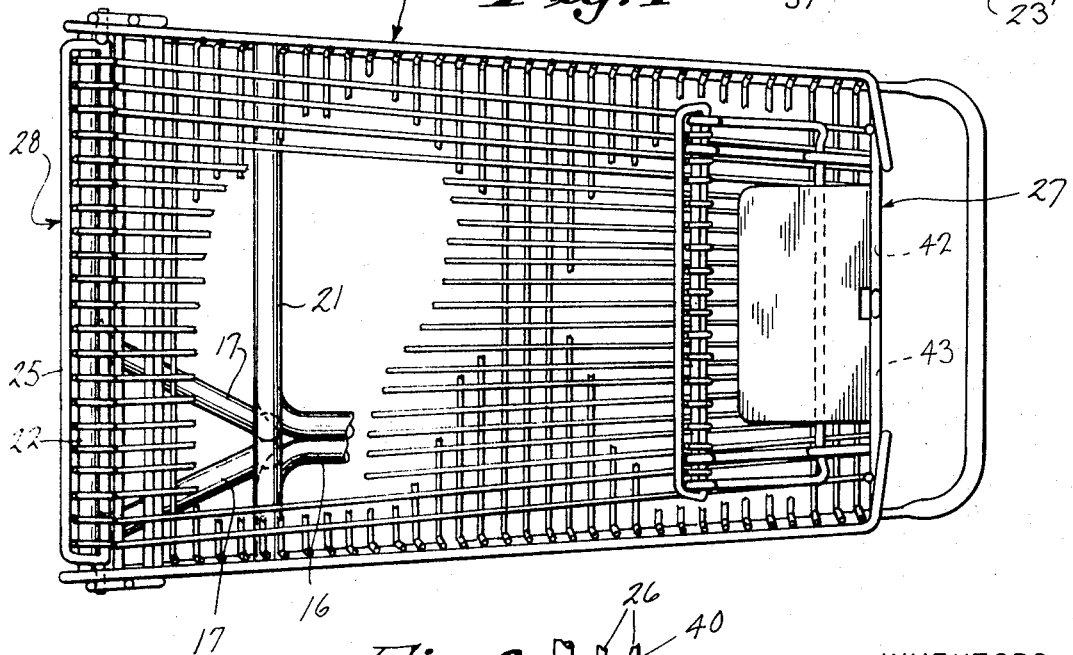
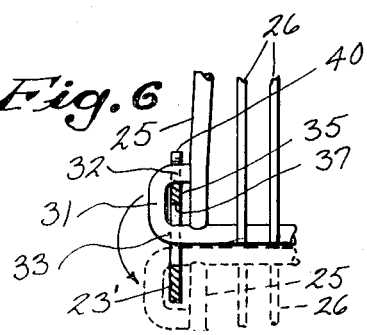

PATENTED AUG 7 1973 3,751,059

INVENTORS
DAVID N. DUNDER
HOWARD L. JAMES

BY

*Morsell & Morsell*

ATTORNEYS

CANTILEVER-TYPE, NESTABLE SHOPPING CARTS

BACKGROUND OF THE INVENTION

1. Field of the Invention

The present invention relates to the field of shopping carts, and more particularly to nestable, cantilevered shopping carts, or so-called "over-the-counter" carts, of the type used in increasing numbers of supermarkets and the like.

2. Description of the Prior Art

Conventional cantilevered shopping carts are ordinarily tapered forwardly with the wide end of the basket forming the rear thereof and with the rear basket wall forming a top-hinged gate, which design is inconvenient when the basket is in overlying relation to the checkout counter and the cashier or checker wishes to slide the contents of the cart basket onto the counter surface in order to avoid the task of manually lifting the individual packages from the basket and placing the same on the counter. It has been found that it is faster and more convenient to have the forward end of the basket the wider end, with a swingable gate therein, so that the checker can merely push the contents forwardly and out of the front of the basket onto the counter. The advantages of such a basket design were recognized and disclosed in Swanson U.S. Pat. No. 3,052,319. In said prior Swanson structure, however, the gate members in the basket forward wall are designed to swing in a horizontal plane, and the opening of said gates to remove the basket contents requires the time-consuming and inconvenient manual unlocking of an associated bolt assembly. Moreover said Swanson gate design includes a complex spring closing mechanism, all of which results in an assembly which is not only less convenient and versatile than that employed in the present invention, but which adds to the construction cost of the cart.

The tapering of most conventional shopping carts forwardly to provide a relatively narrow front end is intended to permit the pushing of one cart forwardly to urge the top-hinged rear wall of a cart in front thereof upwardly and to thus permit the basket on said rearward cart to be partially projected into the basket on said forward cart in telescopic, so-called nesting relation to conserve space when said carts are not in use, there being no limit to the number of carts that can be thus aligned and arranged in a nested condition. Unfortunately, however, and unlike the cart of the present invention, when said conventional shopping carts are forcibly urged into said nesting relationship the weight of the top-hinged gate and baby seat assembly bearing on the basket of the cart therebehind tends to hold said carts together and sometimes makes it difficult for a customer to separate the same when she desires to use one of the carts.

Cantilevered shopping carts of the type herein concerned, wherein the basket is adapted to be positioned immediately above and overlying the checkout counter, are designed at the present time with the basket-supporting standard or leg, which projects upwardly from the wheeled base, positioned on one side or corner of said base and basket members, as in the Swanson U.S. Pat. No. 3,052,319 hereinabove referred to. It has been found, however, that this type of construction results in severe stresses on the basket and supporting standard, particularly when the basket is filled with merchandise, which substantially shortens the useful life of said cart.

A further shortcoming of many conventional style shopping carts is that a baby seat is formed therein adjacent the wide, rearward portion of the basket where it substantially restricts the merchandise-holding space within said wide basket end, as well as impeding the opening of the rear wall or gate to permit the removal of merchandise from said basket end. Moreover, in said conventional carts the baby seat must be folded or pivoted to an upright, compact condition when the carts are nested, which is inconvenient as well as necessitating a relatively complex and expensive construction in comparison to the baby seat assembly featured in the present invention.

Examples of prior shopping carts of the general type hereinabove described are disclosed in the following U.S. Pat. Nos. 3,052,319; Re. 25,616, 2,639,161; 2,672,218; 2,583,514; 3,245,498; and 3,517,773.

SUMMARY OF THE INVENTION

The present invention provides an improved cantilever-type shopping cart, which carts are so designed that the basket portion of the cart is adapted to overlie the checkout counter and is provided with a hinged gate at one end thereof to permit the cashier or checker to merely slide the merchandise out of said basket and onto the counter.

Unlike prior cantilevered shopping carts of the type herein concerned, such as the carts disclosed in the Swanson U.S. Pat. Nos. 3,517,773 and 3,052,319, wherein the hinged, mating gates at the wide forward end of the basket swing in a horizontal plane and require complex spring-loaded closing means and locking bolt assemblies, the swingable, bottom-hinged gate featured in the present invention is adapted to be manually swung in a vertical plane either forwardly or rearwardly from its upright, closed position to an open position, and without the necessity for complex spring or locking assemblies. The result is that the present basket construction is not only more durable and long-lasting, but is substantially less expensive to manufacture than said prior baskets.

A further object of the present invention is to provide a new and improved gate member in the basket front wall, as described, wherein a unique interfitting bracket and gate assembly allows said gate to be quickly and easily manually swung forwardly and downwardly when it is desired to unload the basket, and which gate is adapted to be automatically urged rearwardly and downwardly from its upright, closed position when engaged by the rearward end of another cart when it is desired to nest the same.

A further object of the present invention is to provide a cantilevered cart design having an improved front gate and bracket assembly as described wherein said gate-retaining brackets also form an integral part of the basket-supporting means and promote the secure and stable mounting of said cantilevered basket.

A further object of the invention is to provide a cantilever-type shopping cart as described wherein the upright leg members supporting said cantilevered basket are spaced inwardly from the side thereof to provide more stable and effective support means for said basket, particularly when it is filled with merchandise, than is provided by prior cantilever-type carts wherein the basket is supported solely from one side or corner thereof.

A further object of the present invention is to provide a novel shopping cart wherein the forward end is the wide end thereof, as described, and wherein a baby seat is provided at the smaller, rearward end of said tapered basket where it will not as materially limit or restrict the merchandise-holding capacity of said cart, in contrast to most conventional shopping carts wherein the baby seat, if any, is positioned at the wide end of said cart.

A further object is to provide a shopping cart having a baby seat at the small, rearward end thereof, as described, which baby seat can be easily manually folded from its upright, operative position to a compact position substantially flat against the bottom of the basket when it is not required, thus permitting utilization of the full merchandise-holding capacity of the basket.

A further object of the invention is to provide a cantilevered shopping cart having a baby seat at the small, rearward end thereof, as described, which assembly includes a novel, flat panel member adapted to assume a vertical position in covering relation to the leg openings in the cart rear wall when the seat is not in use, to prevent merchandise from falling through said openings, and which panel member automatically swings downwardly to a horizontal position when said baby seat assembly is swung to its open position, said flat panel providing a more comfortable seat for the child than the wire bottom of the basket.

A further object is to provide a shopping cart having an integral baby seat therein, as described, which baby seat does not have to be swung to its collapsed position in order to permit the nesting of said carts.

A further object of the invention is to provide a cantilever-type shopping cart as described wherein at least a portion of the bottom of the basket slopes downwardly toward the forward end thereof to facilitate the removal of the basket contents from the front end of said basket.

A further object is to provide a shopping cart having a wide forward end with a bottom-hinged drop gate therein as described which carts can be nested without the necessity of forcing a relatively heavy top-hinged gate and associated baby seat assembly upwardly to permit the insertion of one cart into another, as in most conventional shopping carts, thereby not only facilitating the nesting of said carts but also permitting the easier separation of said carts by the customers.

A further object is to provide an improved shopping cart of the type described wherein there is little or no cart-to-cart contact between said carts when they are in their nested condition, thereby avoiding the wedging of said carts together and further facilitating the separation of said carts by the customers.

A further object of the invention is to provide a shopping cart as described including a form thereof wherein the bottom of the basket is provided with substantially flat, horizontal portions adjacent both the forward and rearward ends thereof, thus requiring only a slight taper on the intermediate portions of the bottom and sides to permit the nesting of said carts.

Still further objects of the present invention are to provide a new and improved cantilever-type shopping cart which is simple in design, relatively economical to manufacture, and rugged and durable in construction.

BRIEF DESCRIPTION OF THE DRAWINGS

In the accompanying drawings, wherein the same reference numerals designate the same parts in all of the views:

FIG. 1 is a perspective view showing a plurality of the improved carts in nested relation;

FIG. 2 is a perspective view of the cart basket with the hinged gate at the front end thereof in its open, downwardly-hanging position;

FIG. 3 is a fragmentary side elevational view of the forward end of the basket illustrating the hinged gate and gate-retaining bracket assembly;

FIG. 4 is an enlarged fragmentary side elevational view of said gate-retaining bracket assembly showing said gate in its upright position, and, in broken lines, in its downwardly-hanging position;

FIG. 5 is another side elevational view of said gate-retaining bracket;

FIG. 6 is a fragmentary front elevational view of said gate-retaining bracket assembly, taken along line 6—6 of FIG. 4;

FIG. 7 is a top plan view of the basket;

DESCRIPTION OF THE PREFERRED EMBODIMENT

Referring now more particularly to FIG. 1 of the drawings, the improved cantilever-type shopping cart comprising the present invention includes a carriage or base 10 formed of tubular stainless steel or the like, each of said carts including a forward pair of swivel casters or wheels 11 and a rearward pair of wheels 12. A plurality of transverse steel rods 13 extend across said tubular base frame to reinforce the same and to provide a horizontal shelf upon which merchandise can be carried if necessary. The rods 13 are part of a hinged grill which can be raised at the front end to permit nesting of the carts. Said tubular base frame includes a forward end 10' and a wider rearward end which is open to permit the forward base portion of one cart to be partially projected into the tapered base or carriage of the cart in front thereof to provide a nesting relationship, as illustrated in FIG. 1.

Figure 11:
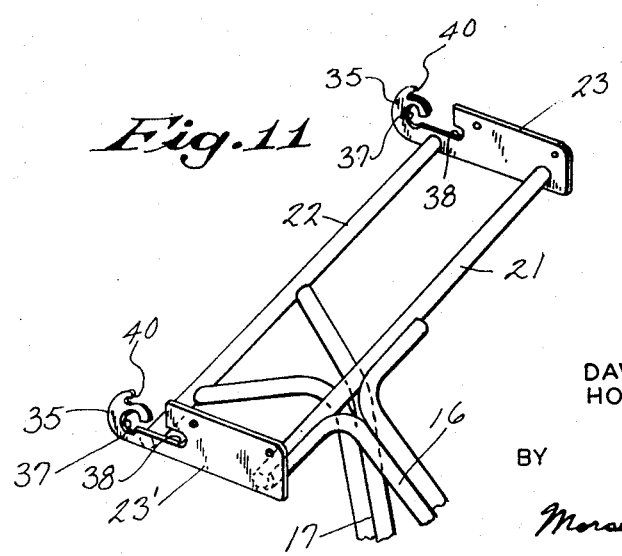
FIG. 11 is a fragmentary perspective view of a portion of the basket-supporting assembly featured in the invention.

Projecting upwardly from the wheeled base 10 of each of said carts is a pair of spaced inverted U-shaped tubular members 14, 15, and extending upwardly from said members, at a point spaced inwardly from the side of the base, are upwardly-converging double leg units 16, 17 which support the basket 20 in the present invention. As best appears in FIG. 11 of the drawings, said converging leg members 16, 17 are joined at their upper ends and rigidly secured to a pair of spaced rods 21, 22 which underlie and support the basket (not shown), said rods 21, 22 extending between a pair of steel bracket elements 23, 23' which not only cooperate to form said basket-supporting structure but which brackets also provide unique means for pivotally retaining the swingable gate 25 at the forward end of the basket in the present invention, as will be hereinafter described in greater detail.

The basket 20 featured in the present invention is formed of stainless steel rods 26, hereinafter referred to as the ribs, and is tapered rearwardly to provide a rearward end 27 and a substantially wider forward end 28, the purpose of which rearwardly-tapered arrangement is to permit the telescopic reception of the rearward portion of one basket within the open forward end of the basket in back thereof when said carts are in the nested condition illustrated in FIG. 1. The purpose of nesting said carts, of course, is to conserve space in the supermarket or other establishment when they are not in use.

As is shown in FIGS. 2 and 7, the baskets 20 featured in the present invention preferably have handles 30 secured to the rearward ends thereof, to facilitate the pushing of said wheeled carts around the store, and said handles include integral side extensions 30' which extend the length of the basket 20, along the lower side portions thereof, and are rigidly secured by rivets $30_a$ to the bracket elements 23 to provide increased rigidity and stability for said basket.

Said baskets 20 are preferably so designed that at least a portion of the bottoms thereof slope downwardly somewhat toward the basket forward end to promote the unloading of the basket, as will be described. In this respect, in one embodiment of the invention the portions of the bottom adjacent both the forward and rearward ends of the basket are flat, and only the intermediate portion of said bottom is inclined. The purpose of the latter bottom design is to provide a baby seat at the basket rear which is flat for greater comfort, and wherein the flat forward portion of said bottom prevents merchandise placed in the basket from piling up against the basket forward wall.

With respect now more particularly to the novel hinged forard wall or gate 25 featured in the present invention, it will be noted in FIG. 3 that when said gate is in its closed position it is inclined forwardly somewhat and extends upwardly to a point projecting slightly above the top of the basket. Said basket gate 25 is provided with integral rectangular loop-like members 31 including a top bar 32 and lower bar 33 (FIG. 6) which project laterally outwardly at the opposite ends of its bottom edge, which members are loosely carried in hook-like elements 35 formed on the forward portions of the aforementioned steel bracket members 23, said brackets projecting slightly forwardly of the basket front end on the opposite sides thereof (FIG. 2). Said hooks 35 are permanently closed by the forwardmost rigid rod or rib 26' (FIGS. 4 and 5) forming the basket bottom, and thus there is provided a relatively large oval, vertically-disposed opening 37 in said bracket forward portion through which the lower hinge member bar 33 projects and is movably retained. Said brackets 23 also include rearwardly-directed horizontal slots 38 within which the forwardmost upright ribs 26 forming the sides of the basket are retained to secure said brackets in place, in conjunction with bolt assemblies 39 (FIG. 3) or the like.

As shown in FIGS. 3-5, the upper edge portion of the bracket hook 35 is provided with a rearwardly-facing hook or stop element 40, and when it is desired to retain the basket forward wall or gate 25 in its upright, closed position said gate is merely manually adjusted so that the upper bar portions 32 of the integral hinge members 31 thereon bear against said hooks 40, as shown in full lines in FIGS. 3, 4 and 6, the forward inclination of said gate causing the same to bear against said hook and retain said basket in its closed condition.

To swing said gate 25 rearwardly to a position wherein it will lie substantially flat within the basket 20, as when it is desired to nest a plurality of carts, the force of the handle on the rearward end of the cart in front thereof bearing against said gate will automatically readily push said gate rearwardly to its open position, thereby allowing the nesting of said carts without requiring any manual manipulation of the gates, and without requiring the forcing upwardly of a heavy swing gate and attached baby seat, as in conventional shopping carts. Moreover, in the present invention the elimination of such a heavy, top-hinged gate bearing downwardly on the basket projected therein facilitates the separation of said carts by a customer. With respect to the nesting of said carts, incidentally, the present carts are preferably designed for only about 6" nesting, with minimal cart-to-cart contact, thereby eliminating the wedging of said carts together and further easing the job of the customer in pulling said carts apart.

When it is desired to swing the gate 25 forwardly from its upright, closed position, as when the cantilevered basket is positioned over a checkout counter and the cashier or checker wishes to transfer the merchandise onto the counter without having to lift each package out of the basket, it is merely necessary to lift said gate 25 slightly to clear the retaining shoulder 40, which vertical movement is permitted by the opening 37 within the bracket (the lower element 33 of the gate hinge member 31 temporarily assuming the position designated "A" in FIG. 5), and said gate is then free to swing forwardly and downwardly to a horizontal position (as shown in broken lines in FIG. 3) resting on the checkout counter. It is an easy matter for the checker to then slide the basket contents forwardly through the enlarged open front of the basket and onto the counter.

If desired the gate 25 can be swung completely downwardly to the hanging position illustrated in broken lines in FIGS. 3 and 4, and when said gate is in the latter condition the hinge elements 33 formed thereon rest on the bottom of the bracket openings 37 as indicated at "B" in FIG. 4.

Figure 8:
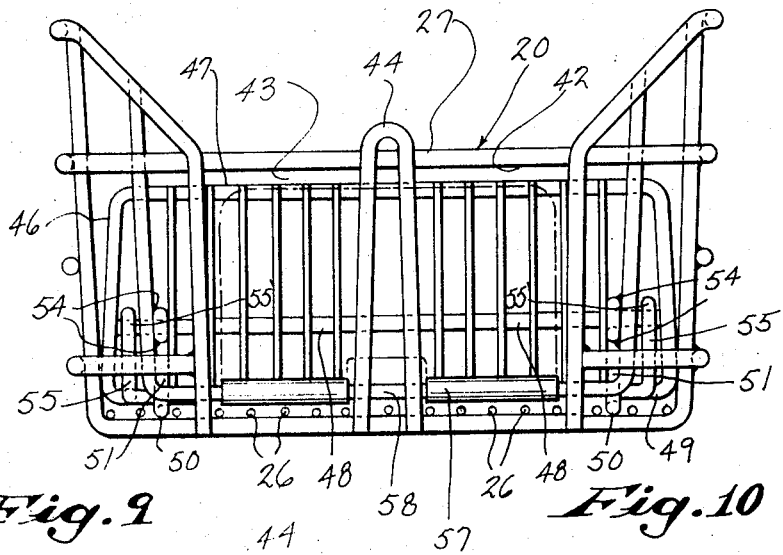
FIG. 8 is a rear elevational view of the basket with the baby seat in its upright, operative position.

Referring now to the novel baby seat assembly featured in the present invention, which is located at the smaller, rearward end of the basket as described, as is shown in FIG. 8, the rear wall 27 of the basket is provided with a pair of spaced openings 42, 43 through which a child's legs can project when he is seated in the basket, facing rearwardly. Said openings 42, 43 are separated by an upright inverted U-shaped member 44 adapted to be straddled by the child's legs.

Figure 9:
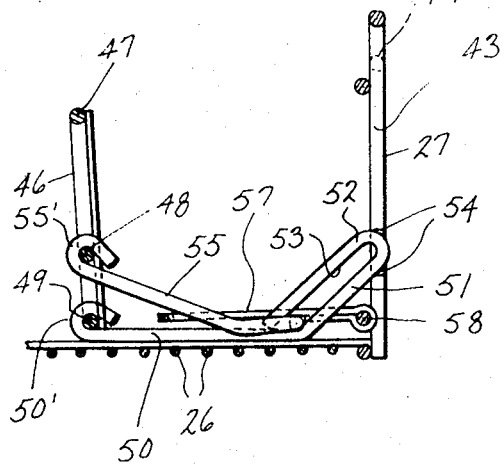
FIG. 9 is a simplified side elevational view of the baby seat in its operative position.

As best appears in FIG. 9, the seat assembly includes a back rest 46, formed of a plurality of spaced vertical steel rods, a top horizontal rod 47, an intermediate horizontal rod 48, and a bottom horizontal rod 49 positioned immediately adjacent the bottom of the basket, said rods extending substantially the width of the basket so that the baby seat is formed, in effect, by said back rest and by the regular side walls and bottom of the basket. As is shown in said FIG. 9 said seat back rest 46 is provided with a rearwardly-extending bottom rod 50 welded or otherwise permanently secured to the basket bottom which rod has a curved forward end portion 50' freely encircling the back rest bottom transverse rod 49 (there being an identical assembly adjacent the opposite end of said back member) which rod 50 extends rearwardly in a horizontal plane a distance substantially equal to the height of the back rest 46. Said rod 50 is provided with a leg portion 51 deflected upwardly at an angle from said back point and welded to one of the ribs forming said basket back wall, as indicated at 54. Said rod 50 (and the identical rod on the opposite side of the basket) is then deflected forwardly and downwardly to form a leg 52 spaced from and parallel to the aforementioned leg portion 51 thereby providing an angled slot-like opening 53 therebetween.

Also extending rearwardly from said seat back rest 46 is a rod 55 which freely encircles the aforementioned intermediate transverse back rod 48, as at 55' (FIGS. 9 and 10), and extends rearwardly and downwardly at an angle to the basket bottom at a point spaced several inches from the basket back wall 27 (there being a similar rod adjacent the opposite side of the basket). Said rod 55 then continues rearwardly in a horizontal plane and is bent to form a transverse rod portion connecting said rods to form a continuous rod 55, which rod 55 is slidably carried in the aforementioned angled slots 53 provided by the parallel inclined legs 51, 52 on the opposite sides of the basket.

Figure 10:
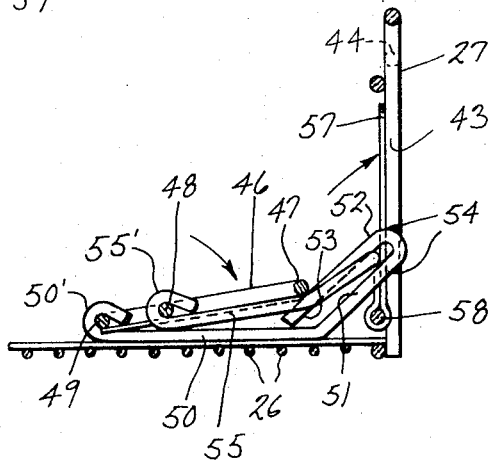
FIG. 10 is a similar side elevational view showing said baby seat in its collapsed, non-operative position.

When it is desired to swing the back rest 46 of the present baby seat rearwardly to a position substantially flat against the bottom of the basket, where it will not restrict the merchandise-holding capacity of said basket, said rod member 55 is designed to ride upwardly in the inclined slots 53 to permit such pivotal movement of said back member 46, as illustrated in FIG. 10, thereby providing a novel collapsible baby seat assembly which is not only simple to operate, but which is inexpensive in design and construction.

As mentioned, the back wall 27 of the basket 20 in the present invention is provided with a pair of leg openings 42, 43, and in order to prevent merchandise from falling therethrough when the baby seat is in its collapsed, non-operative position a flat panel 57, of plastic or other desired material, which is hingedly connected to a transverse rod 58 forming a part of said basket back wall 27 (FIGS. 9 and 10) is designed to be automatically urged upwardly to a substantially vertical but slightly forwardly inclined position in covering relation to said leg openings by the rod member 55 when the latter moves upwardly in the inclined slots 53 as hereinabove described. When it is desired to use the baby seat, and the back rest 46 is manually swung forwardly from its collapsed position of FIG. 10 to its upright position of FIG. 9 said flat panel 57 automatically swings downwardly by gravity to a horizontal position overlying the basket bottom (FIGS. 7 and 9), where it provides a comfortable seat for the child. In addition, advertising indicia or the company name, or the like, can be displayed on said flat panel 57 if desired.

As described, the advantages of the novel baby seat assembly featured in the present invention are not only that it is located at the smaller, rearward end of the basket, where it will not usurp as much merchandise-holding space as those conventional carts wherein the seat is located in the wide end of the basket, but in the present invention it is not necessary to collapse said baby seats prior to nesting the carts. Moreover, as described, the present seat assembly is provided with a novel pivotal panel member associated with said seat assembly which is so designed that it covers the leg openings in the basket rear wall when said seat is not in use, thereby preventing merchandise from escaping through said openings, as well as forming a more comfortable seat for the child when said unit is in its assembled, upright position.

From the foregoing detailed description it will be seen that the present invention comprises a novel cantilever-type or so-called "over-the-counter" shopping cart which is a definite improvement over prior shopping carts of the same general type. Unlike said conventional carts, the wide end of the present cart is the forward end and said forward end of the basket is provided with a unique bottom-hinged gate assembly. Said novel gate can either be swung forwardly onto the checkout counter to permit the easy transfer of the basket contents onto said counter, or said gate member is adapted to be automatically urged rearwardly and downwardly from its upright, closed position to a substantially flat condition within the basket when said gate is engaged by the rearward end of another cart when it is desired to nest the same. In addition, and unlike the gate assemblies utilized in some prior cantilever-type shopping carts, the present gate member does not require any spring closing means or complex bolt locking devices.

Another important advantage of the present invention, in contrast to prior cantilever-type shopping carts, is that the leg means projecting upwardly from the wheeled base to support the basket are spaced inwardly from the side thereof to provide more stable and effective support means than is possible with those prior carts wherein the basket is supported solely from one side or corner thereof. Further, as hereinabove described, the present cart is provided with a new collapsible baby seat design which is superior to the baby seats heretofore utilized in shopping carts.

It is to be understood that while one preferred embodiment of the present invention has been illustrated and described herein, numerous variations or modifications thereof will undoubtedly occur to those having skill in this art. What is intended to be covered herein, therefore, is not only the form of the invention disclosed, but also any and all variations or modifications thereof as may come within the spirit of said invention.

What I claim is:

1. A cantilever-type shopping cart comprising: a wheeled base having a forward end and having an open, relatively wider rearward end adapted to receive the forward end of a cart therebehind when a plurality of said carts are nested in telescopic relation; basket-supporting means extending upwardly from said base at a point spaced inwardly from the side thereof; a merchandise-holding basket formed of spaced rods supported by said supporting means in a cantilevered manner permitting said basket to overlie a checkout counter, said basket having a rear wall with a pair of leg openings therein and a relatively wider forward end, the basket side walls being tapered rearwardly from said forward end to said smaller rearward end, and said basket having a bottom with a portion thereof inclined downwardly toward said forward end of the basket; a bracket member permanently secured to said basket side walls with a hook portion projecting slightly forwardly of the forward end of the basket, said hook portion forming a vertically-disposed oval opening and said hook portion having a rearwardly-facing shoulder formed on its upper edge; a gate adapted to close the forward end of said basket, said gate having a hinge element extending laterally outwardly from each side of the bottom thereof, each hinge element including an upper rod member and a lower rod member projected through and movably retained within said bracket opening, whereby said gate can be positioned in an upright, slightly forwardly-inclined position with the upper rod of said hinge element bearing against said rearwardly-facing shoulder on the hook portion to releasably retain said gate in said upright, basket-closing position, and whereby said gate can be lifted slightly to clear said shoulder and then swung forwardly and downwardly about said lower rod member of the hinge element to a position resting on a checkout counter, the rearwardly-facing design of said bracket shoulder permitting said gate to be automatically swung rearwardly and downwardly from its closed position to a position substantially flat against the basket bottom by the engagement of said gate with the rearward end of another cart to allow the partial insertion of said latter cart into the basket when said carts are nested.

2. A shopping cart comprising a wheeled base, basket-supporting means extending upwardly from said base, a merchandise-holding basket supported by said basket-supporting means, said basket having a bottom with a relatively wide forward end and having side walls which angle toward one another away from said forward end, a gate of less width than the spacing between said side walls at the forward end of the basket adapted to close said forward end, cooperating hinge means on said basket and gate located adjacent the bottom of the gate whereby the bottom of said gate is hingedly connected to said basket, said cooperating hinge means including hinge pins on the gate and including upright pin-receiving openings having lower portions below the bottom of the basket and having upper portions above the bottom of the basket and including elements for releasably retaining said hinged gate in its upright basket-closing position, said releasable retaining means providing for manual swinging of said gate forwardly and downwardly, while the hinge pins are in said lower portions of the openings, from its upright closed position to a position to permit discharge of the contents of the basket, and said releasable retaining means permitting swinging of the gate, while the hinge pins are in said upper portions of the openings, rearwardly and downwardly from its upright position to a position within and lying substantially flat against the bottom of the basket when it is desired to nest carts in telescopic relationship.

3. A shopping cart as claimed in claim 2 in which said releasable retaining elements of said cooperating hinge means are so located that they automatically releasably hold the gate in a forwardly-tilted upright position against further downward movement by gravity.

4. A shopping cart as claimed in claim 2 in which the releasable retaining means for the hinged gate permits automatic rearward and downward swinging movement of the gate in response to pressure from the rearward end of a like shopping cart when it is desired to nest said carts.

5. A shopping cart comprising a wheeled base, basket-supporting means extending upwardly from said base, a merchandise-holding basket supported by said basket-supporting means, said basket having a bottom with a relatively wide forward end and having side walls which angle toward one another away from said forward end, a gate of less width than the spacing between said side walls at the forward end of the basket adapted to close said forward end, cooperating hinge means on said basket and gate located adjacent the bottom of the gate whereby the bottom of said gate is hingedly connected to said basket, said cooperating hinge means including elements for releasably retaining said hinged gate in its upright basket-closing position, said releasable retaining means providing for manual swinging of said gate forwardly and downwardly from its upright closed position to a position to permit discharge of the contents of the basket, and said releasable retaining means permitting swinging of the gate rearwardly and downwardly from its upright position to a position within and lying substantially flat against the bottom of the basket when it is desired to nest carts in telescopic relationship, the upper portion of the basket-supporting means including spaced brackets, one on each side of the basket near the forward end thereof, the forward ends of said brackets providing said hinge means for cooperation with the hinge means on the gate.

6. A shopping cart as claimed in claim 5 in which there are attaching elements between the spaced brackets and the basket attaching the basket to the basket-supporting means.

7. A shopping cart comprising a wheeled base, basket-supporting means extending upwardly from said base, a merchandise-holding basket supported by said basket-supporting means, said basket having a bottom with a relatively wide forward end and having side walls which angle toward one another away from said forward end, a gate of less width than the spacing between said side walls at the forward end of the basket adapted to close said forward end, cooperating hinge means on said basket and gate located adjacent the bottom of the gate whereby the bottom of said gate is hingedly connected to said basket, said cooperating hinge means including elements for releasably retaining said hinged gate in its upright basket-closing position, said releasable retaining means providing for manual swinging of said gate forwardly and downwardly from its upright closed position to a position to permit discharge of the contents of the basket, and said releasable retaining means permitting swinging of the gate rearwardly and downwardly from its upright position to a position within and lying substantially flat against the bottom of the basket when it is desired to nest carts in telescropic relationship, each hinge means on the basket including a rearwardly-directed hook having an interior opening and having an upwardly-projecting external shoulder, and each hinge means on the gate including a laterally-projecting hinge element having spaced upper and lower rod members, each lower rod member being retained within the opening of a hook, and the upper rod member being engageable with said shoulder when the gate is swung in a forward direction whereby the gate is releasably maintained in a basket-closing position against opening movement by gravity.

8. A shopping cart as claimed in claim 7 in which the openings of the hooks are of a size to permit raising of the gate to clear the shoulders when it is desired to swing the gate forwardly and downwardly to an open position.

9. A shopping cart as claimed in claim 7 in which each hinge element on the gate is in the form of a loop.

* * * * *